(12) United States Patent
Guo et al.

(10) Patent No.: US 7,019,887 B1
(45) Date of Patent: Mar. 28, 2006

(54) LIGHT MODULATOR DEVICE

(75) Inventors: James Z. Guo, Corvallis, OR (US); Adel Jilani, Corvallis, OR (US); Steve P. Hanson, Albany, OR (US); Jeffrey S. Obert, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/101,820

(22) Filed: Apr. 8, 2005

(51) Int. Cl.
*G02B 26/08* (2006.01)
*G02B 26/00* (2006.01)

(52) U.S. Cl. .................. 358/290; 359/291; 359/223; 359/224

(58) Field of Classification Search .............. 359/290, 359/291, 223, 224, 292, 295
See application file for complete search history.

(56) References Cited

U.S. PATENT DOCUMENTS

| | | |
|---|---|---|
| 5,998,906 A | 12/1999 | Jerman et al. |
| 6,373,682 B1 | 4/2002 | Goodwin-Johansson |
| 6,377,438 B1 | 4/2002 | Deane et al. |
| 6,449,079 B1 | 9/2002 | Herrmann |
| 6,583,921 B1 | 6/2003 | Nelson |
| 6,650,445 B1 | 11/2003 | Witte et al. |
| 6,666,561 B1 | 12/2003 | Blakley |
| 6,694,071 B1 | 2/2004 | Hsu |
| 6,943,933 B1 * | 9/2005 | Radominski et al. ....... 359/293 |
| 2001/0053016 A1 | 12/2001 | Nelson |
| 2004/0080806 A1 | 4/2004 | Blakley |
| 2004/0218251 A1 | 11/2004 | Piehl et al. |
| 2004/0219706 A1 | 11/2004 | Wan |

* cited by examiner

*Primary Examiner*—Timothy Thompson (57) ABSTRACT

A light modulator device includes a charge plate; a reflective plate and post, the post supporting the reflective plate parallel relative to the charge plate such that a gap is formed between the charge plate and the reflective plate, the gap being relatively smaller on a first side than on a second side when the reflective plate is parallel to the charge plate.

28 Claims, 6 Drawing Sheets

LIGHT MODULATOR DEVICE

BACKGROUND

Many display systems make use of light modulator devices that include arrays of individual pixel elements. These pixel elements are frequently light modulator devices. For example, some light modulator devices include a reflective plate supported above a charge plate by posts. The posts are frequently offset to one side of the modulator device such that when opposing charges are established on the reflective plate and charge plate, the reflective plate rotates relative to the charge plate. As the reflective plate rotates, it does so between the posts. Relatively large electrostatic forces are frequently used to cause the reflective plate to thus rotate.

The relative large forces used may make the use of relatively large posts desirable. The light reflecting effectiveness of each light modulator device may depend, at least in part, on how much of the available surface area the reflective plate occupies. Relatively larger posts provide larger restoring force, but may occupy more of the available surface area, thereby decreasing the light reflecting efficiency of the light modulator device.

This may result in less available light getting to a target image. The resulting image brightness may thus be relatively low. Further, the posts' structures can also be a source of reflected or scattered light when the mirror is in the off-state, not directing light to the target image.

SUMMARY

A light modulator device includes a charge plate; a reflective plate and post, the post supporting the reflective plate parallel relative to the charge plate such that a gap is formed between the charge plate and the reflective plate, the gap being relatively smaller on a first side than on a second side when the reflective plate is parallel to the charge plate.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

The light modulator devices provide for increased light transmission and relatively low activation energy. In particular, light from a light source is directed to the light modulator device. Each light modulator device includes a reflective element and a charge plate that are separated by a mechanically-biased capacitance gap. The size of this gap determines, at least in part, the characteristics of the light that is directed away from the light modulator device.

By selectively establishing a charge difference between the reflective element and the charge plate, the distance between the charge plate and capacitance gap, and thus the characteristics of light directed away from the light modulator device, may be controlled. Several exemplary light modulator devices will be discussed that include mechanically-biased capacitance gaps.

The reflective plate is configured to have a charge established thereon, such as by an electron beam, while the charge plate is configured to have an opposing force established thereon. The resulting opposing forces cause an electrostatic force between the opposing plates. The electrostatic force is greater on one side of the light modulator device than the other side of the device due to the mechanically-biased capacitance gap. As a result, an electrostatic force established between the reflective plate and the charge plate causes the reflective plate to tilt relative to the charge plate. By selectively controlling this tilt, the light modulator is able to modulate light that is incident thereon.

The input of several light modulator devices may then be combined to form an image. The configuration of such light modulator devices may improve image brightness and provide optimized dynamic response, while minimizing reflector or scatter light. A display system will first be described, followed by several exemplary light modulator devices and a description of a method of forming such devices.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
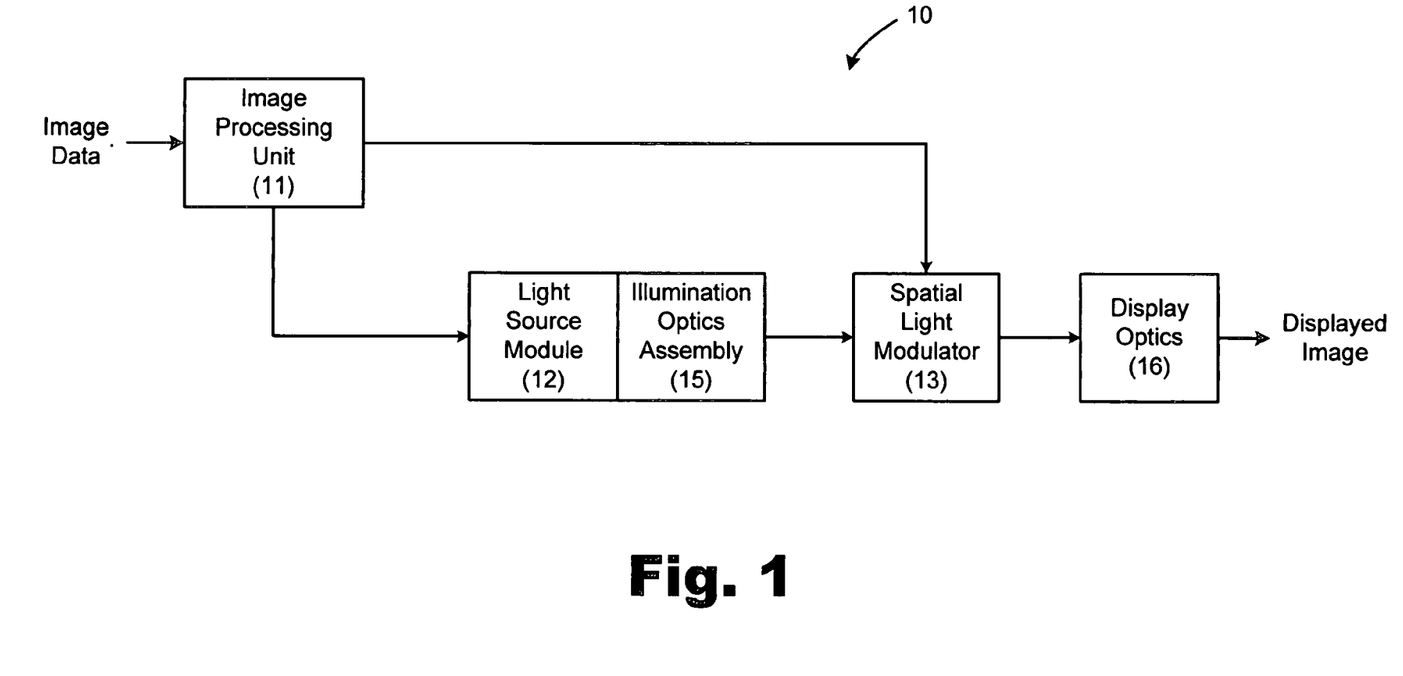
FIG. 1 illustrates a schematic view of a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10). While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a spatial light modulator (SLM) (13).

The light source module (12) includes a lamp assembly, which may for example include a burner coupled to a reflector. The light source module (12) may also include an light integrator that spatially homogenizes the light and directs it to the illumination optics assembly. The light source module (12) is positioned with respect to an illumination optics assembly (15). The illumination optics assembly (15) focuses light from the light source module (12) on the SLM (13).

The terms "SLM" and "modulator" will be used interchangeably herein to refer to a spatial light modulator. The incident light may be modulated in its color, phase, intensity, polarization, or direction by the SLM (13). The SLM (13) includes a plurality of individual light modulator devices. Several exemplary light modulator devices will be discussed below. One exemplary light modulator device includes an integrated post, hinge, and mirror configuration that supports the mirror above a charge plate.

The mirror is configured to rotate relative to the charge plate in response to the signals from the image processing unit (11). When the mirror is tilted, light from the light source module (12) is directed to the display optics (16) to form part of the displayed image. When the mirror is not activated, the mirror remains in a default position and the light is not directed to the display optics (16), and thus does not form part of the displayed image. By controlling the frequency with which the light modulator device is activated, the light modulator device is able to produce an output that varies between light and dark.

As introduced, one exemplary light modulator device includes an integrated post, hinge, and mirror that supports the mirror above a charge plate. This configuration may lower the stress level within the posts while minimizing the presence of the posts in the light path. This can increase the light output, contrast ratio, and gray scale of the projection system. Further, the posts may be located on a center axis of the light modulator device with a mechanically-biased capacitance gap, which allows more stable mirror titling. In particular, according to exemplary embodiments discussed below, the gap between the mirror and the charge plate is larger on one side of the center axis than on the other.

The display optics (16) may include any device configured to display or project an image. For example, the display optics (16) may be, but are not limited to, a lens configured to project and focus an image onto a viewing surface. The viewing surface may be, but is not limited to, a screen, television, wall, liquid crystal display (LCD), or computer monitor.

Light Modulator Device with Mechanically-Biased Capacitance Gap

Figure 2:
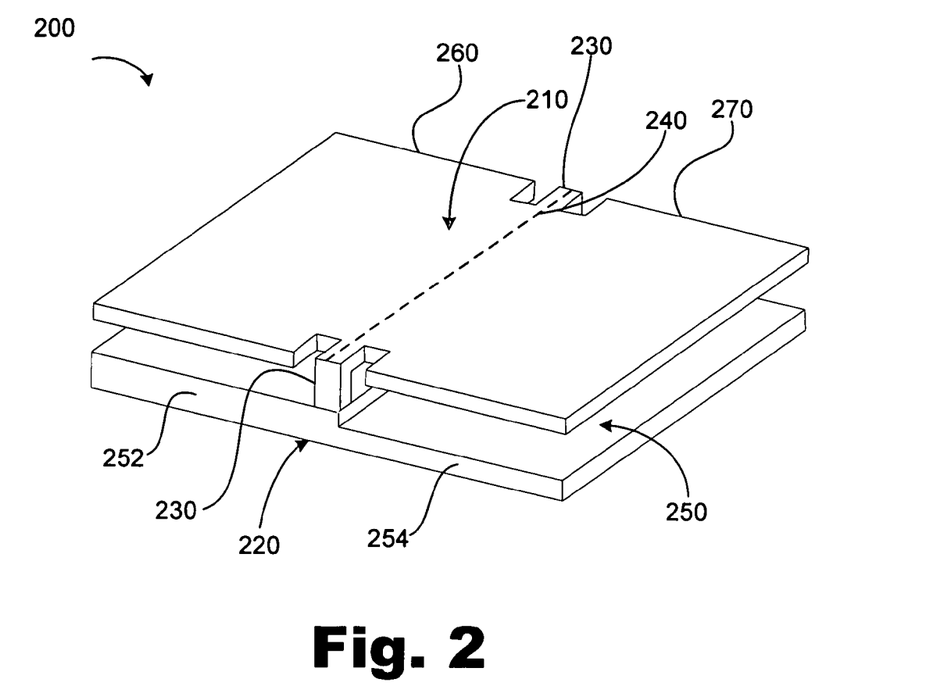
FIG. 2 illustrates a perspective view of a light modulator device according to one exemplary embodiment.
Figure 3:
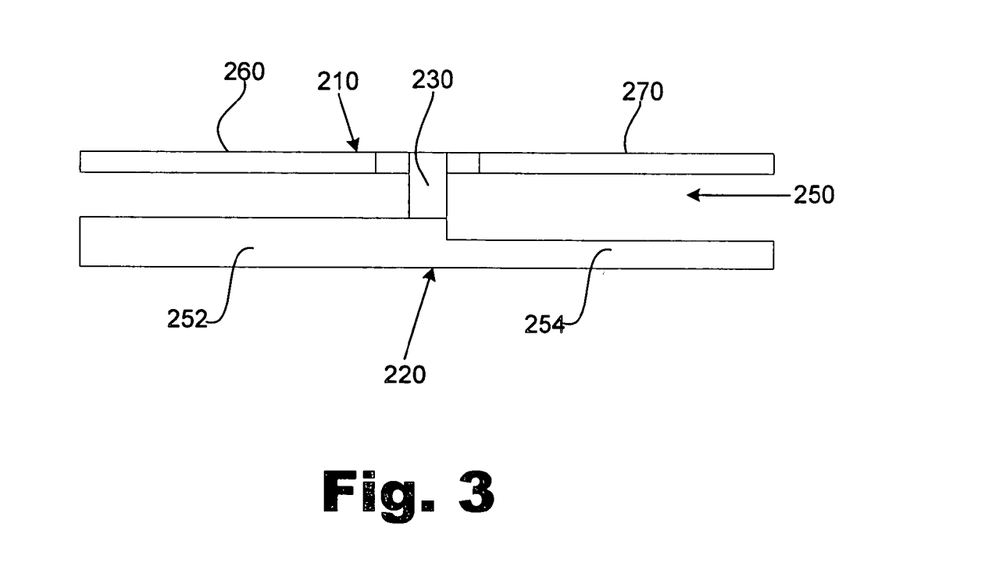
FIG. 3 illustrates a side view of a light modulator device according to one exemplary embodiment.

FIGS. 2 and 3 illustrate a light modulator device (200) according to one exemplary embodiment. In particular, FIG. 2 illustrates a perspective view of the light modulator device (200) while FIG. 3 illustrates a side view of the light modulator device (200). The light modulator device (200) includes a reflective plate (210) and a charge plate (220). The reflective plate (210) is supported relative to the charge plate by a pair of opposing posts (230). An axis (240) formed between the center of the posts (230) corresponds closely to the central axis of the reflective plate (210).

For ease of reference, the distance or gap between the reflective plate (210) and the charge plate (220) shall be referred to as a "capacitance gap." The capacitance gap (250) between the reflective plate (210) and the charge plate (220) is mechanically biased. In other words, the size of the capacitance gap is different on opposing sides of the axis (240). According to one exemplary embodiment, a first side (252) of the charge plate (220) is thicker than an opposing second side (254) of the charge plate.

As a result, when the light modulator device (200) is in a neutral state position the first side (260) of the reflective plate (210) is relatively closer to a first side (252) of the charge plate (220) than a second side (270) of the reflective plate (210) is to a second side (254) of the charge plate (220).

The reflective plate (210) may have an electron beam selectively directed thereon. The electron beam may be directed to the reflective plate (210) from any suitable source, such as an electron gun, as is well known to those of skill in the art.

As electrons from the electron beam strike the reflective plate (210), the reflective plate (210) cause a charge to accumulate on the reflective plate (210). For example, according to one exemplary embodiment, electrons accumulate on the reflective plate, thereby establishing a negative charge on the reflective plate. In addition, bombarding the reflective plate (210) may drive electrons resident on the reflective plate (210) away, thereby establishing a positive charge on the reflective plate.

The charge plate (220) may also be subjected to a charge, such as by coupling the charge plate (220) to an electron beam or a charge source. When a charge differential is established between the reflective plate (210) and the charge plate (220), an electrostatic force is established therebetween.

The magnitude of this electrostatic force depends, at least in part, on the distance between the two charges. In particular, as the distance between the charges decreases, the electrostatic force therebetween increases. Accordingly, when a charge differential is established between the reflective plate (210) and the charge plate (220), a relatively larger force is established between the first side (260) of the reflective plate (210) and the charge plate (220) than the force between the second side (270) of the reflective plate (210) and the charge plate (220).

This difference between the forces causes the first side (260) of the reflective plate (210) to be drawn toward the charge plate (220). As the first side (260) of the reflective plate (210) is drawn toward the charge plate (220), the reflective plate (210) tilts relative to the charge plate (220).

The degree to which the reflective plate (210) tilts depends, at least in part, on the charge differential between the reflective plate (210) and the charge plate (220). As previously discussed, by controlling the rate or frequency of the tilt, the light modulator device (200) is able to modulate light that is incident thereon.

The light modulator device (200) described thus far is a reflective type light modulator device (200). The reflective surface on the reflective plate (210) can be formed on the front side (i.e., on the surface facing away from the electron guns), or it can be on the backside (i.e., on the surface facing the electron guns). In the case where the reflective surface is formed on the back side of reflective plate (210), the charge plate (220) may be formed of a transparent material, such that light may be directed through the charge plate (220) to the reflective plate (210). For example, the charge plate may be formed of indium tin oxide (ITO). The light modulator device (200) also includes a current drain, such as a high impedance resistor (300). The high impedance resistor (300) is coupled to the reflective plate (210), and selectively removes charge established on the reflective plate. Those of skill in the art will appreciate that the light modulator device may be for other modes of operation.

Exemplary Performance

Figure 4:
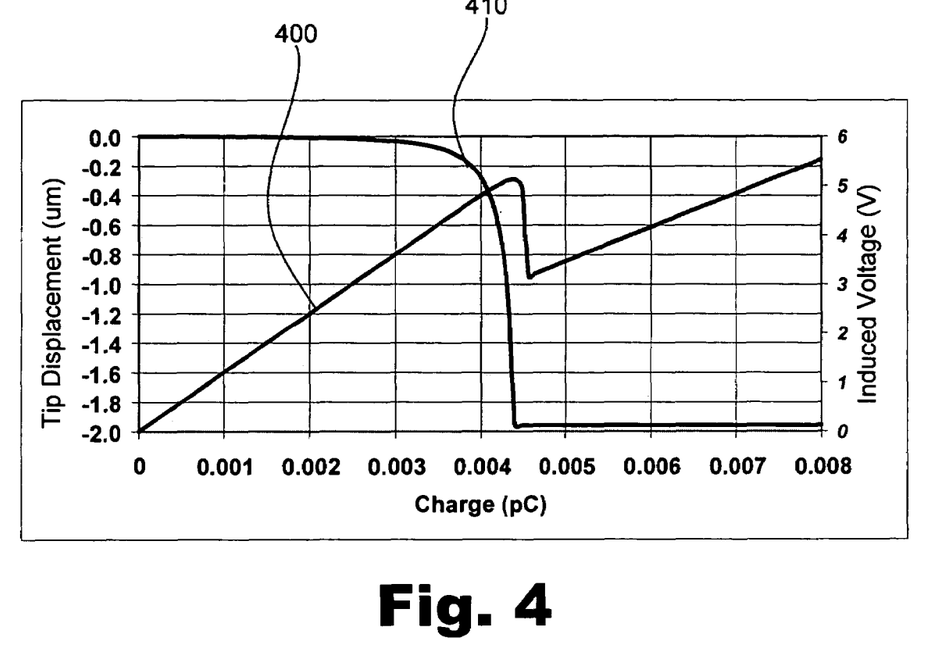
FIG. 4 illustrates a static electromechanical analysis of a light modulator device according to one exemplary embodiment.
Figure 5:
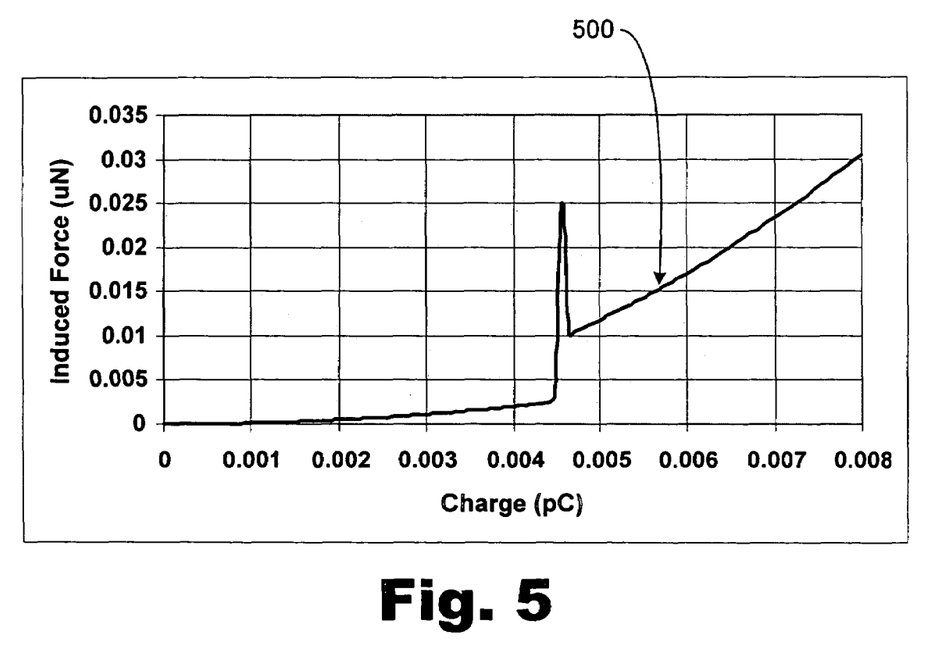
FIG. 5 illustrates a static electromechanical analysis of a light modulator device according to one exemplary embodiment.

FIGS. 4–5 illustrate modeled static performance results of a light modulator device according to one exemplary embodiment. In particular, FIGS. 4–5 illustrate the performance of a 10×10 μm AlCu diagonal reflective plate with a torsional spring stiffness of approximately 1.7 μN/μm. An electrode of 10 um×10 um area is located 2 um below the mirror. Further, the charge plate (220; FIG. 2) includes a top layer of approximately 200 angstrom SiO2 layer with a dielectric constant of approximately 3.9.

FIG. 4 plots the induced tip displacement (400) and the induced voltage (410) as a function of the charge applied to the reflective plate (210; FIG. 2). A 200 angstrom step bias was introduced to the first side (265; FIG. 2) of the charge plate (220; FIG. 2) to force the first side (265; FIG. 2) of the reflective plate to tilt downward, as previously discussed. The thickness of the reflective plate (210; FIG. 2) is approximately 0.5 micrometers. In the static analysis, the charge was ramped up from 0 to 0.008 pC and both mirror tip displacement and induced voltage are computed and plotted as a function of applied charge.

As shown in FIG. 4 charge pull-in occurs at an applied charge of approximately 0.0044 pC and that the voltage drops when the mirror tilts downwards. FIG. 5 shows the resultant electrostatic force (500) induced by the applied charge. In particular, as shown in FIG. 5, the induced force increases rapidly at 0.0044 pC, or at approximately the drawn in value. This rapid relatively small-induced force indicates the switch requires a relatively small force for activation and that the light modulator device may be rapidly switched. The dynamic response of the present exemplary light modulator device will now be discussed in more detail.

Figure 6:
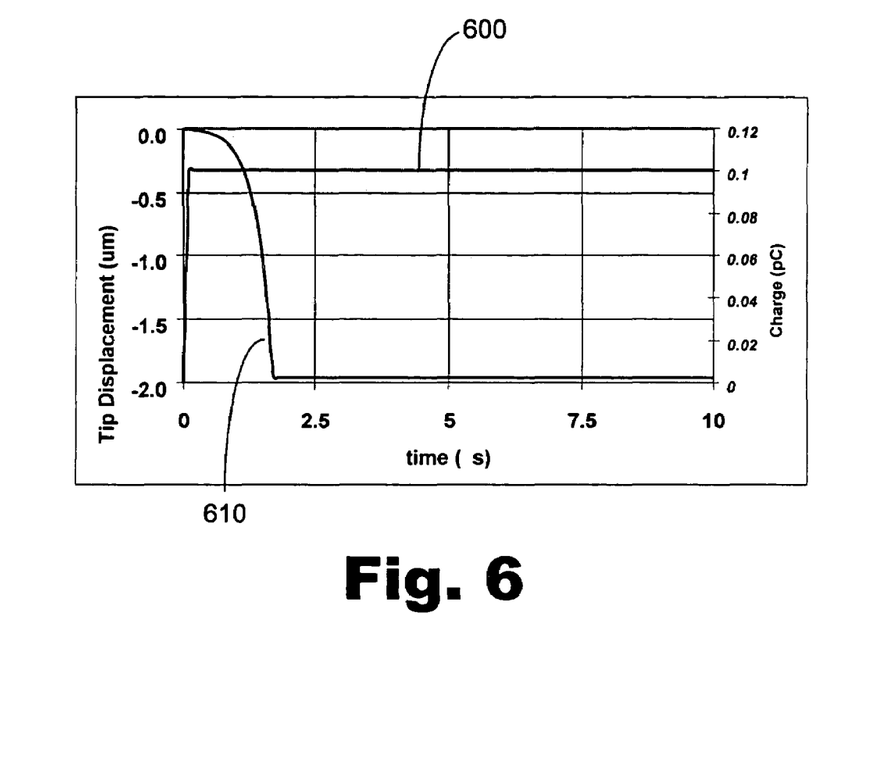
FIG. 6 illustrates a performance analysis of a light modulator device according to one exemplary embodiment.
Figure 7:
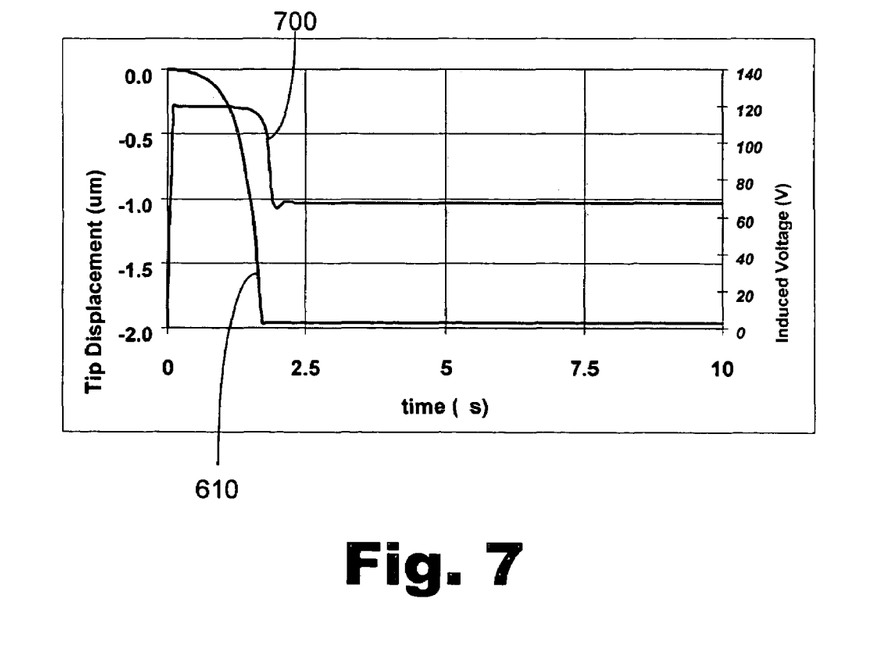
FIG. 7 illustrates a performance analysis of a light modulator device according to one exemplary embodiment.
Figure 8:
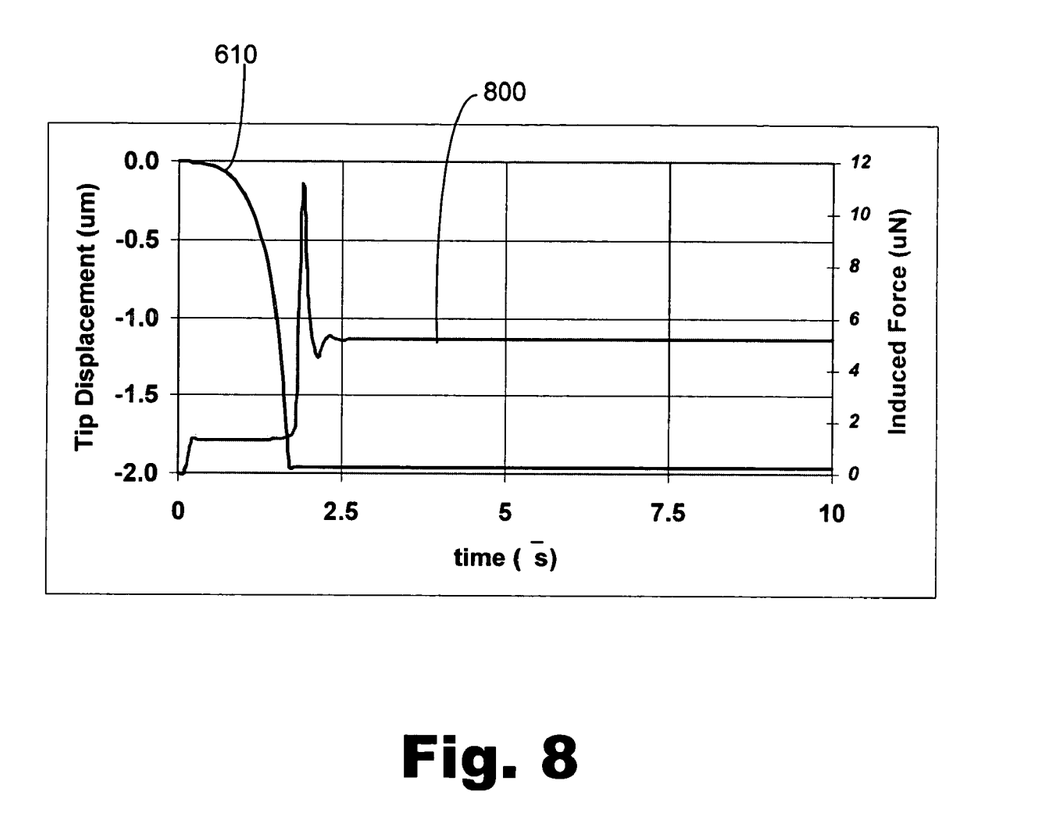
FIG. 8 illustrates a performance analysis of a light modulator device according to one exemplary embodiment.

FIGS. 6–8 show dynamic analysis results of a light modulator device according to one exemplary embodiment in which the maximum charge applied is approximately 0.1 pC. As seen in FIG. 6, the charge (600) was linearly ramped up to the maximum value in 10 ns and then kept constant until steady state was reached. Mirror tip displacement (610) is computed and plotted with respect to time.

As shown in FIGS. 7–8, induced voltage (700), and induced resultant electrostatic force (800) are also plotted as a function of time and the corresponding tip displacement (610). Again, a 200 angstrom step bias was used on one side of the charge plate (220; FIG. 2) to force that side of the mirror to tilt downward. Moreover, a 200A $SiO_2$ layer on top of the electrode was incorporated into the model to avoid direct contact between the mirror and the electrode.

Accordingly, as show in FIGS. 4–8, the configuration of the light modulator device (200) provides for relatively low actuation forces and rapid switching speed.

Method of Forming

Figure 9:
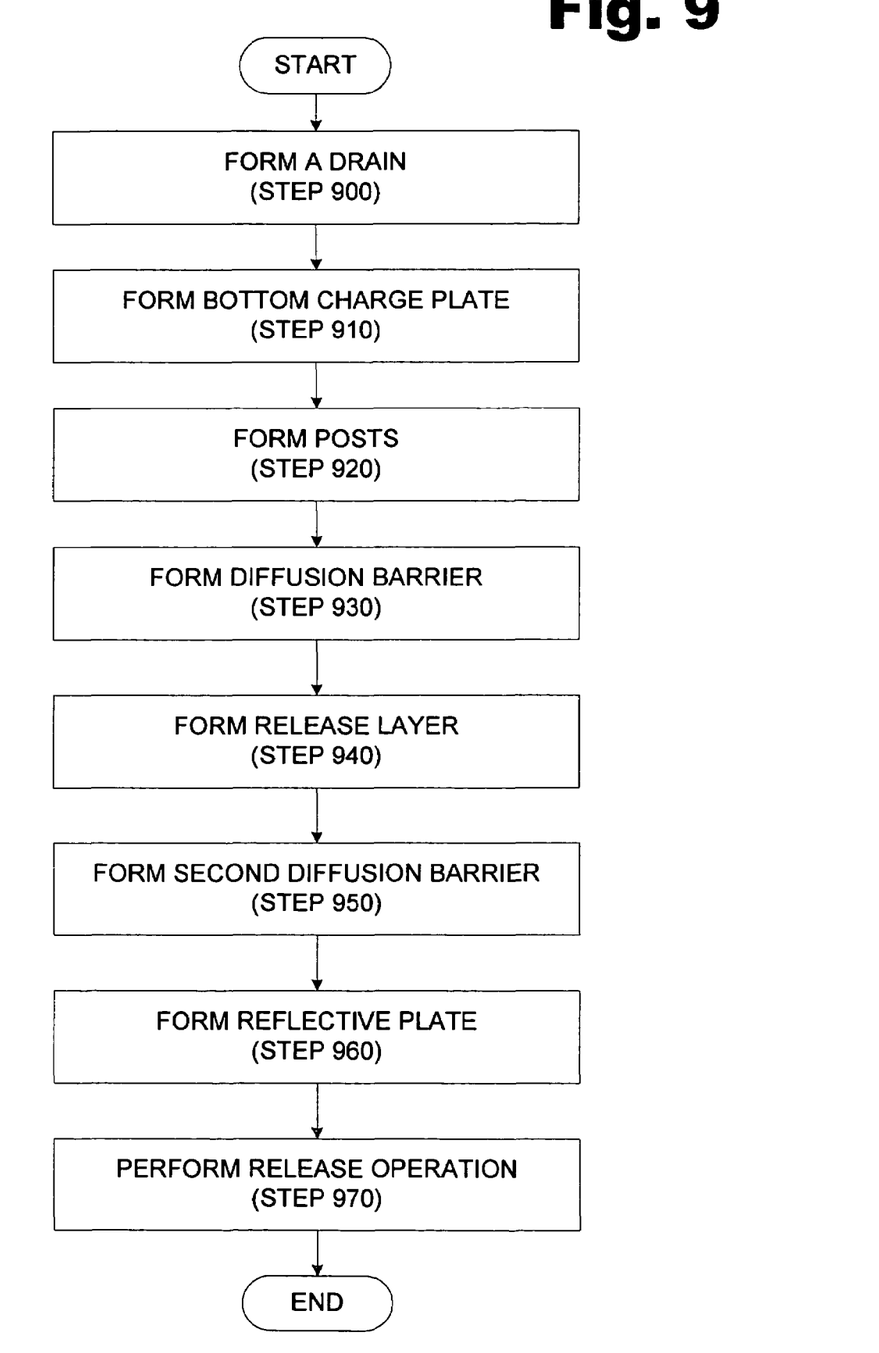
FIG. 9 is a flowchart illustrating a method of forming a light modulator device according to one exemplary embodiment.

FIG. 9 illustrates a method of forming a light modulator device according to one exemplary embodiment. The method begins by forming a current drain on a substrate (step 900), such as a high impedance resistor. In particular, well-known deposition/photo/etch processes may be used to form the current drain. For ease of reference, the formation of individual layers discussed below will be discussed with reference to deposition/photo/etch processes.

After the high impedance resistor has been formed, the bottom charge plate may be formed (step 910). The formation of the bottom charge plate may include the formation of a layer of tetraethylorthosilicate (TEOS). The layer of TEOS includes vias formed thereon that extend to the current drain. A layer of indium tin oxide (ITO) may then be formed on the layer of TEOS. The layer of ITO may be formed such on one side of the light modulator device. Thereafter, a second layer of TEOS may be formed on the layer of ITO. By selectively depositing the ITO and second layer of TEOS on one side of the charge plate, the charge plate is thicker on one side than the other.

After the stepped bottom charge plate is formed, posts are then formed (step 920). The posts may be formed such that each is coupled to the current drain. The posts may be formed such that a line containing the centers of each of the posts passes through a central axis of the light modulator device. The posts may be formed of a conductive or metallic material, such as aluminum. A first diffusion barrier, such as a layer of SiN, may then be deposited (step 930). According to the present exemplary method, the diffusion barrier may be formed on the entire device, including the charge plate and the post.

Thereafter a release layer is formed on the diffusion barrier (step 940). The release layer may be formed of a layer of silicon. The thickness of the release layer corresponds to the gap distance between the reflective plate and the charge plate. In particular, a uniform layer of silicon may be initially deposited. One side of the initially deposited silicon layer may be slightly higher than the other side, due to the deposition of the silicon layer on the stepped charge plate. This initial silicon layer may then be selectively etched to form a substantially planar surface. This planar surface may include the top surface of the posts previously formed.

Once the release layer has been formed, a second diffusion barrier is formed on the release layer (step 950). The second diffusion barrier may be a layer of SiN. The formation of the second diffusion barrier according to the present exemplary method includes selectively etching through the diffusion barrier to expose the posts. Exposing the posts may allow a top plate formed on the posts to be more securely coupled thereto and to serve as an integral hinge. The first and second diffusion barriers minimize the diffusion of the metal into the release layer.

Accordingly, the next step is to form a reflective plate (960). The reflective plate may be a layer of aluminum. After the reflective plate is formed, a release operation is then performed (step 970) to release the release layer previously formed. As the release layer is removed through the release operation, a mechanically-biased capacitance gap is formed between the reflective plate and the charge plate.

The reflective plate is configured to rotate relative to the charge plate. In particular, the reflective plate is configured to have a charge selectively established thereon, such as by being bombarded by a beam of electrons. The charge plate may have a positive charge established thereon, such that when a negative charge is established on the reflective plate, an electrostatic force is established between the charge plate and the reflective plate. The mechanically-biased capacitance gap discussed above, causes the electrostatic force to be greater on one side of the light modulator device than the other. The resulting force causes the reflective plate to tilt relative to the charge plate. As previously discussed, by selectively tilting the charge may modulate light that is incident on the light modulator device.

In conclusion, a light modulator device is described herein that provides for increased light transmission and relatively low activation energy. In particular, light from a light source is directed to the light modulator device. Each light modulator device includes a reflective element and a charge plate that are separated by a capacitance gap. The size of this gap determines, at least in part, the characteristics of the light that is directed away from the light modulator device. By selectively establishing a charge difference between the reflective element and the charge plate the distance between the charge plate and capacitance gap, and thus the characteristics of light directed away from the light modulator device, may be controlled.

The reflective plate is configured to have a charge established thereon, such as by an electron beam, while the charge plate is configured to have an opposing force established thereon. The resulting opposing forces cause an electrostatic force between the opposing plates. The electrostatic force is greater on one side of the light modulator device than the other side of the device due to the mechanically-biased capacitance gap. As a result, an electrostatic force established between the reflective plate and the charge plate causes the reflective plate to tilt relative to the charge plate. By selectively controlling this tilt, the light modulator is able to modulate light that is incident thereon.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

The invention claimed is:

1. A light modulator device, comprising:
   a charge plate;
   a reflective plate and post, said post supporting said reflective plate parallel relative to said charge plate such that a gap is formed between said charge plate and said reflective plate, said gap being relatively smaller on a first side than on a second side when said reflective plate is parallel to said charge plate.

2. The device of claim 1, wherein said reflective plate is configured to have a negative charge selectively established thereon.

3. The device of claim 1, wherein said reflective plate is configured to have a positive charge selectively established thereon.

4. The device of claim 1, wherein said charge plate is relatively thicker on a first side than on a second side.

5. The device of claim 1, wherein said reflective plate is formed directly on said post.

6. The device of claim 1, wherein said reflective plate comprises a reflective surface formed on an outer portion thereof.

7. The device of claim 1, wherein said reflective plate comprises a reflective surface formed on an inner portion thereof.

8. The device of claim 1, wherein said light modulator device comprises a reflective type device.

9. The device of claim 1, wherein said charge plate comprises a transparent material.

10. The device of claim 1, and further comprising a current drain coupled to said post, said current drain being configured to selectively remove charge from said reflective plate.

11. A display system, comprising:
    a light modulator device including a charge plate, a reflective plate and post, said post supporting said reflective plate parallel relative to said charge plate such that a gap is formed between said charge plate and said reflective plate, said gap being relatively smaller on a first side than on a second side;
    an electron source configured to selectively establish a charge differential between said charge plate and said reflective plate to thereby cause said reflective plate to tilt relative to said charge plate;
    a light source module optically coupled to said light modulator device; and
    display optics optically coupled to said light modulator device.

12. The system of claim 11, wherein said light modulator device is a reflective type device.

13. The system of claim 11, wherein said charge plate comprises a transparent conductor.

14. The system of clam 13, wherein said transparent conductor comprises indium tin oxide.

15. The system of claim 13, wherein said light source is optically coupled to a charge plate side of said system.

16. The system of claim 13, wherein said light source is optically coupled to a reflective plate side of said system.

17. The system of claim 11, wherein said electron source comprises an electron gun.

18. The system of claim 11, wherein said electron source is configured to establish a negative charge on said reflective plate.

19. The system of claim 11, wherein said electron source is configured to establish a positive charge on said reflective plate.

20. A method of modulating light, comprising:
    selectively directing light to a reflective plate, said reflective plate being separated from a charge plate on a center post by a mechanically-biased capacitance gap being larger on one side of the center post than on an other side; and
    selectively directing electrons to establish a charge differential between said reflective plate and said charge plate said charge causing said reflective plate to tilt relative to said charge plate in response to an electrostatic force across said capacitance gap.

21. The method of claim 20, wherein directing electrons to said reflective plate establishes a negative charge on said reflective plate.

22. The method of claim 20, wherein directing electrons to said reflective plate establishes a positive charge on said reflective plate.

23. The method of claim 20, wherein selectively directing said light to said reflective plate includes directing light to an outer portion of said reflective plate.

24. The method of claim 20, wherein selectively directing said light to said reflective plate includes directing light to an inner portion of said reflective plate.

25. A light modulator device, comprising:
    a charge plate;
    a reflective plate and post, said post supporting said reflective plate parallel and said reflective plate, said gap being relatively smaller on a first side than on a second side when said reflective plate is parallel to said charge plate; and
    means for establishing a charge differential between said charge plate and said reflective plate.

26. The device of claim 25, and further comprising means for selectively removing a charge from said reflective plate.

27. The device of claim 25, and further comprising means for reflecting light from a reflective plate side of said device.

28. The device of claim 25, and further comprising means for reflecting light from a charge plate side of said device.

* * * * *

UNITED STATES PATENT AND TRADEMARK OFFICE
CERTIFICATE OF CORRECTION

PATENT NO. : 7,019,887 B1
APPLICATION NO. : 11/101820
DATED : March 28, 2006
INVENTOR(S) : Guo et al.

It is certified that error appears in the above-identified patent and that said Letters Patent is hereby corrected as shown below:

In the Claims

Col. 8 (line 53), after "parallel", insert --relative to said charge plate such that a gap is formed between said charge plate--.

Signed and Sealed this

Twenty-sixth Day of December, 2006

JON W. DUDAS
*Director of the United States Patent and Trademark Office*